United States Patent [19]

Bevilacqua

[11] 4,034,338
[45] July 5, 1977

[54] OPERATING CONDITION SIGNAL LIGHT FOR AN AUTOMOTIVE VEHICLE

[76] Inventor: Leno L. Bevilacqua, 1132 Upland Drive, Columbus, Ohio 43220

[22] Filed: Nov. 4, 1975

[21] Appl. No.: 628,756

[52] U.S. Cl. .................................. 340/66; 340/72
[51] Int. Cl.² ........................................ B60Q 1/26
[58] Field of Search ................. 340/66, 71, 72; 200/61.89

[56] References Cited

UNITED STATES PATENTS

| | | | |
|---|---|---|---|
| 2,128,769 | 8/1938 | Finnell | 340/66 |
| 3,281,786 | 10/1966 | Leichsenring | 340/66 |
| 3,676,844 | 7/1972 | Hendrickson | 340/66 |
| 3,821,700 | 6/1974 | Russell | 340/66 |
| 3,921,750 | 11/1975 | Shames | 340/71 X |

*Primary Examiner*—Donald J. Yusko
*Attorney, Agent, or Firm*—Mahoney & Stebens

[57] ABSTRACT

A signal light system is provided for vehicles to indicate the operative condition of the vehicle to another motorist. The signal light system is responsive to acceleration and deceleration of the vehicle in addition to actuation of the braking mechanism in selectively responsive energization of respective indicator lights for each of the three conditions. An electronic control circuit uniquely capable of providing error-free signals responds to a signal input from the brake mechanism for primary control and secondarily responds to actuation of the accelerator pedal for indicating acceleration or deceleration of the vehicle. A pressure responsive switch mechanism is provided for assembly with the accelerator pedal and is the condition-responsive element capable of producing an input signal that effectively eliminates the possibility of generation of error signals by the control circuit. The signal light system is uniquely designed for easy installation into a vehicle by personnel having only minimal skill and knowledge in the technical aspects of a vehicle's systems and components and requiring minimal effort for installation of the accelerator pressure switch.

5 Claims, 5 Drawing Figures

OPERATING CONDITION SIGNAL LIGHT FOR AN AUTOMOTIVE VEHICLE

BACKGROUND OF THE INVENTION

Various signal light systems have heretofore been devised for the general objective of providing a visual indication of particular operating conditions of an automobile vehicle. These operating conditions are generally actuation of the braking mechanism and an indication as to whether the vehicle is accelerating or decelerating. Automotive vehicles are provided with a factory installed brake light indicating system, but the signal light systems to which this invention is directed is of an auxiliary nature to provide a secondary indication to drivers of vehicles that are following a vehicle provided with a signal light system of this invention. Providing of an auxiliary or secondary brake actuation light enhances vehicular operational safety through the simple provision of a second indicator light for the brakes. More importantly, the ability of the signal light system to provide an indication as to whether the vehicle is accelerating or decelerating and thereby provide an anticipatory signal for a following vehicle is a significant factor in improved safety. An anticipatory system indicating that a vehicle is slowing down or decelerating provides an advantageous preliminary warning signal that the brake system may be actuated and produce a sudden stop.

For an example, a prior art system of this type having the anticipatory signal objectives is disclosed in U.S. Pat. No. 3,676,844. That patent discloses a signalling system utilizing mechanically actuated electrical switches for providing the input signals to the control circuit. A substantial disadvantage of such a system utilizing mechanically actuated switches is that the switches must be manufactured and constructed to withstand severely adverse operating conditions and environments and this materially increases the cost of such systems. Additionally, the mechanically actuated switches require precise positioning and orientation in order to correctly respond to accelerating systems and mechanisms and provide the necessarily indication of acceleration or deceleration. Furthermore, the mechanically actuated switches are not as rapidly functioning as is desired for signalling systems of this type.

A subsequent attempt to improve the operating efficiency and effectiveness of such signal light systems is disclosed in U.S. Pat. No. 3,813,542. That patent discloses a system utilizing an optical-electronic device associated with the accelerator pedal. While the optical-electronic device eliminates, or at least alleviates, some of the disadvantages and defects of mechanically actuated switch devices, it will be readily seen that an optical-electronic device is not capable of providing the desired response in all situations. For example, this system is incapable of detecting deceleration of a vehicle where the operator merely releases the pressure applied by his foot to the accelerator pedal. This ineffectivity results from the fact that the foot remains in the light path and prevents the detection of this deceleration. An optical-electronic device is only effective when the foot is entirely removed from the accelerator pedal and this does not happen in a case with all vehicle drivers. Some drivers maintain the foot on the accelerator pedal while applying the other foot to the brake pedal to provide an unannounced deceleration or braking.

SUMMARY OF THE INVENTION

The signal light system of this invention provides the necessary visual indication as to actuation of the braking mechanism of the vehicle and acceleration and deceleration as an anticipatory signal of a possible braking action. Included in the system is an electronic control circuit which responds to an electrical input signal received from the brake system of the vehicle when that system is actuated and, alternatively, reception or interpretation of a signal generated by actuation of the accelerator pedal. Responding to the operation of the accelerator pedal is secondary to operation of the vehicle's brake mechanism and actuation of the brake mechanism will counteract any input or control from the accelerator pedal.

In accordance with this invention, the input control on the accelerator pedal is generated by a pressure responsive switch device which is mounted on the pedal in a position to directly respond to application of pressure to the pedal by the vehicle operator's foot. The pressure responsive switch, which is utilized in the signal light system of this invention, comprises a resilient structure having electrical contacts that are normally maintained in an open circuit condition. The device is responsive to a minimum pre-determined pressure and the application of this minimum pressure results in closing of the electrical contacts and affecting control of the system. Consequently, without a sufficient pressure applied to the accelerator pedal, the switch contacts are maintained in an open circuit condition and the control circuit functions accordingly. However, application of a pressure exceeding that predetermined compressive force required for closing of the contacts results in an associated control input to the control circuit and subsequent energization of the appropriate indicator lights to indicate acceleration of the vehicle. At any time that the pressure on the accelerator is decreased below that predetermined minimum or the foot is removed entirely from the accelerator pedal, the contacts open and this condition is reflected through the control circuit for energization and illumination of the associated indicator light to indicate to the following motorist that the vehicle is decelerating.

The electronic control unit employs electronic circuitry designed to provide an error free system. Such a circuit is not dependent on continued mechanical functioning of the electrical relays normally incorporated in the prior are systems and the circuit of this invention may be embodied in an enclosure by well-known encapsulating techniques where it is not likely to be affected by environmental weather conditions or other extraneous disrupting factors. Furthermore, encapsulation of an electronic circuit such as this substantially reduces the manufacturing cost and construction expenses, while providing a unit that may not be readily opened or affected by persons having insufficient knowledge for properly maintaining the system. The novel control circuitry of this invention results in a system that is readily installed and requires no innerconnection of electrical components and circuits other than to connect the properly marked input leads to the power source and vehicle control elements.

These and other objects and advantages of this invention will be readily apparent from the following detailed description of embodiments thereof and the accompanying drawings illustrative of the apparatus and installation thereof in a vehicle.

DESCRIPTION OF THE DRAWING FIGURES

DETAILED DESCRIPTION OF THE ILLUSTRATIVE EMBODIMENTS

Figure 1:
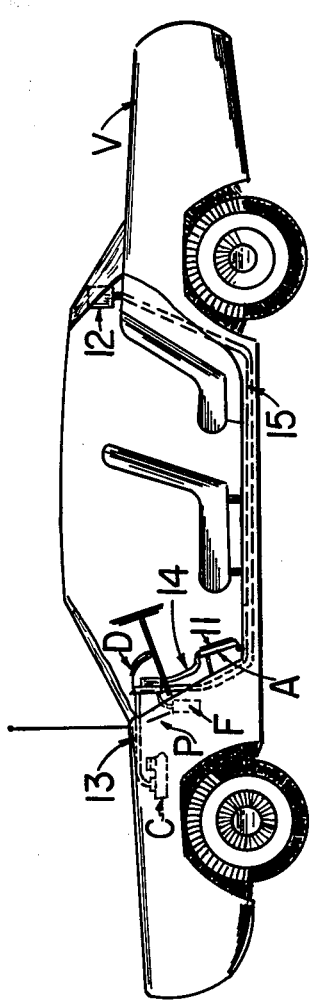
FIG. 1 is an illustration of an automotive vehicle having portions broken away and illustrating installation of the signal light system.
Figure 2:
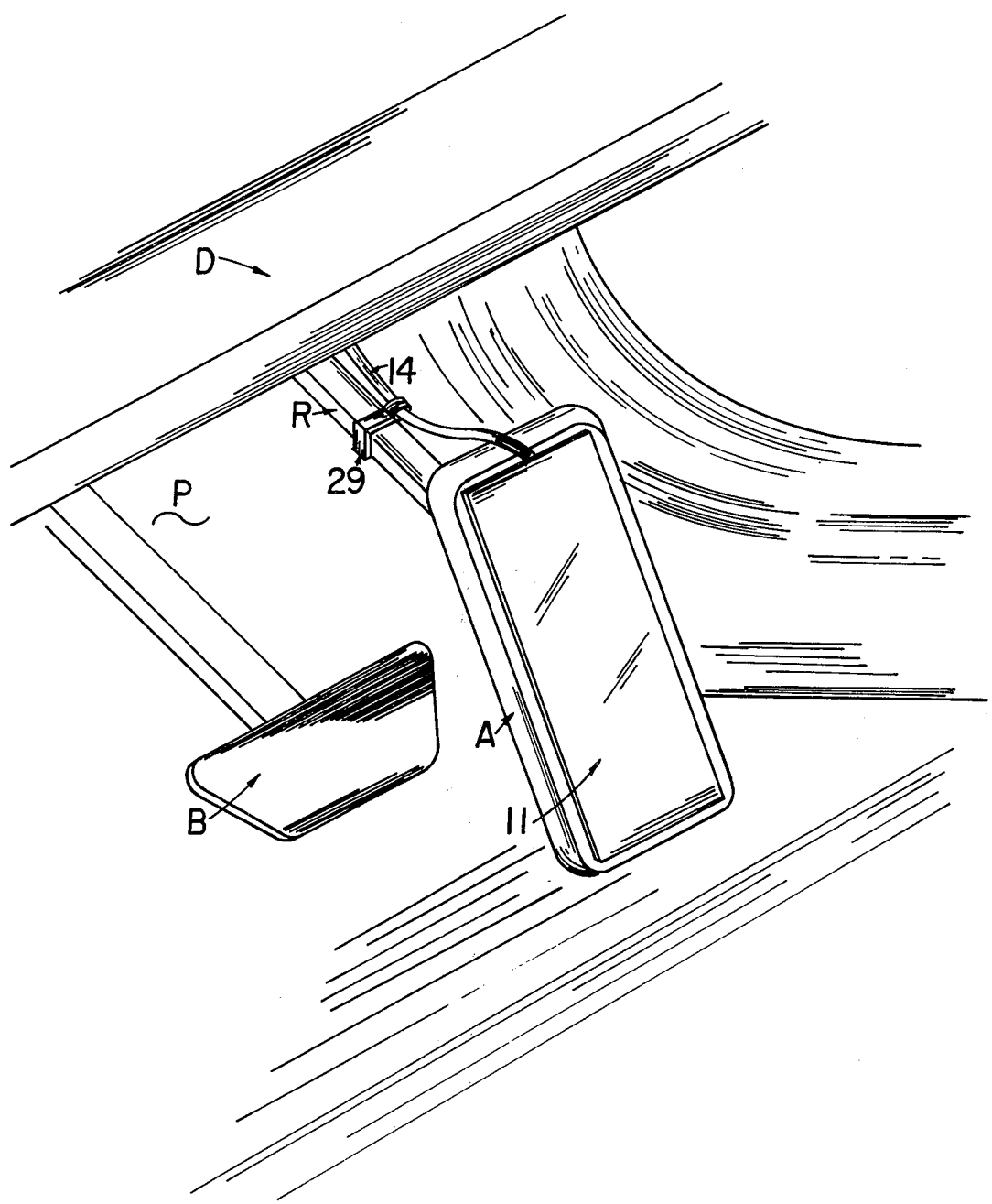
FIG. 2 is an perspective view of the accelerator pedal of the vehicle on a substantially enlarged scale and showing a pressure-responsive switch mounted thereon.

Referring specifically to FIGS. 1 and 2 of the drawings, a vehicle V and components thereof particularly related to this invention are diagrammatically illustrated with the several components of the signal light system of this invention and inter-connection therebetween. For clarity of illustration, portions of the vehicle V in the elevation view of FIG. 1 are broken away to indicate the physical relationship of the accelerator pedal A, brake pedal B and the hydraulic master brake cylinder C of the vehicle's braking system. There is a mechanical connection between the brake pedal B and the master brake cylinder C as is the case between the accelerator pedal A and the unillustrated operating mechanisms of the vehicle's carburetion system. Various forms of brake and accelerator pedals and associated mechanical connections are utilized in the substantial number of makes and models of automotive vehicles and it is to be understood that the particular vehicle illustrated in the drawings in not considered a limitation as to practice of the invention. The apparatus embodying this invention is readily adapted to nearly all vehicle styles. FIG. 2 illustrates the vehicle style there the accelerator pedal A is hinged at the bottom end and is connected by means of an actuating rod R which extends through engine compartment panel P.

The several components forming the apparatus embodying this invention are shown in FIG. 1 as installed within the vehicle V. These components include a main control unit 10, a pressure responsive switch 11 mounted on the accelerator pedal A and a visual indicator unit 12. The control unit 10 is mounted on the engine compartment panel P and is preferably located on the side facing inwardly of the operator's compartment, but is vertically positioned so as not to be visible to the passenger or occupants. As shown in FIG. 1, the control unit 10 is at a vertical elevation so as to be hidden behind the control panel D.

Figure 3:
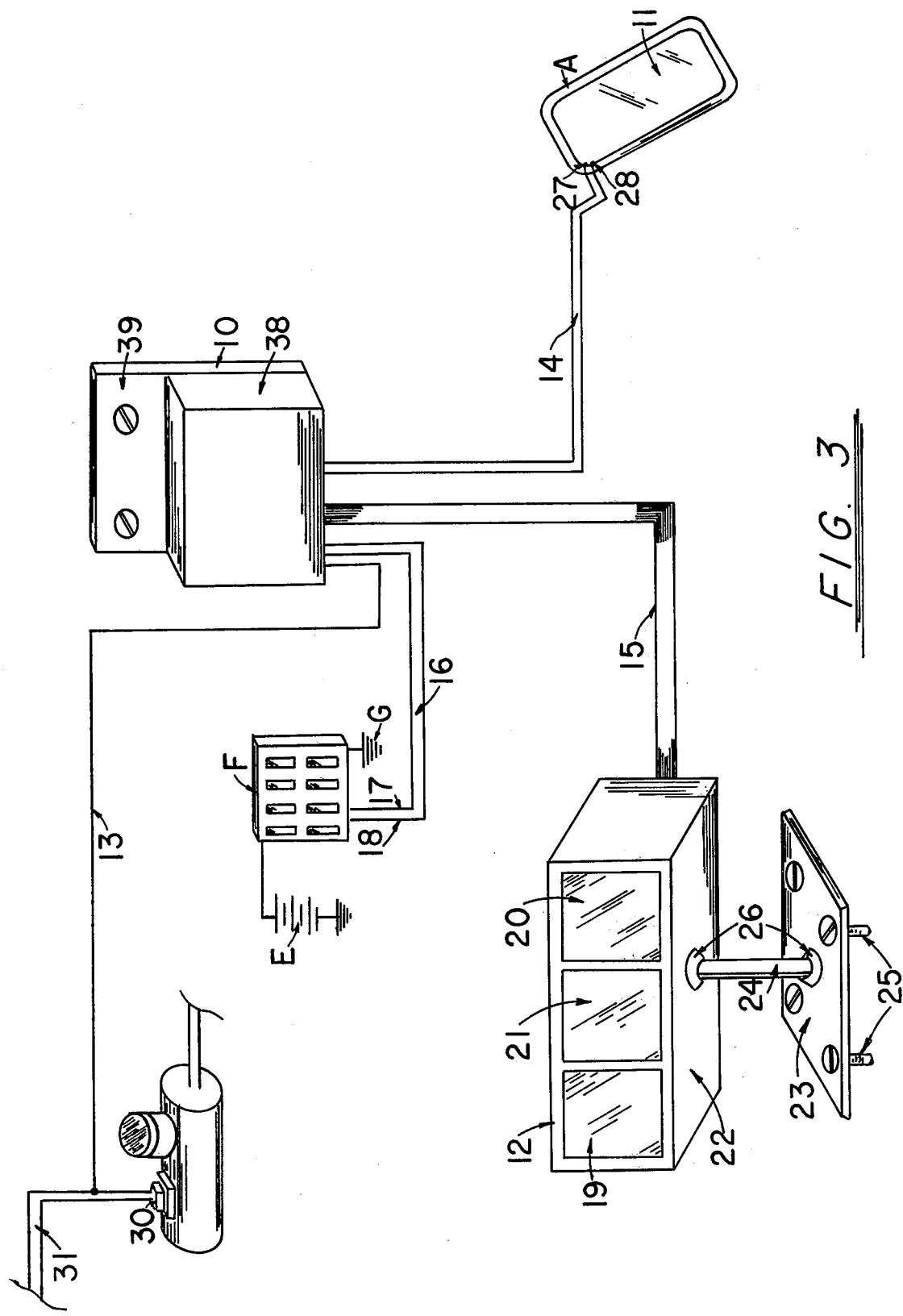
FIG. 3 is a diagrammatic illustration of a signal light system component and the electrical inter-connection thereof with each other and with the vehicle's electrical system and brake system.

As can be best seen in FIGS. 3 and 1, an electrical conductor 13 leading from the control unit 10 projects through the engine compartment panel P and connects with the electrical circuitry associated with the master brake cylinder C. A second electrical cable 14 extends from the control unit 10 and connects with the pressure responsive switch 11 while a third electrical cable 15 inter-connects unit 10 with the visual indicator unit 12. It will be noted that the visual indicator unit 12 is mounted on the rear window ledge L to provide the visual indication of the operating condition to the operator of any following vehicle. The electrical cable 15 which includes several conductors is of a flat configuration that may be conveniently hidden beneath the carpeting or flooring in the interior of the occupant's compartment. This cable may be extended to the exterior of the vehicle and run within the frame elements if such an installation would be more suitable.

Electrical power for operation of the signal system is obtained from the vehicle's electrical system. For this purpose an electrical conductor 16 is provided for connecting the control unit 10 with appropriate terminals located in a fuse-block F which is also on the compartment panel P. This fuse block has a ground connection G and is also connected with the vehicle's battery E. The two conductors 17 and 18 included in the cable 16 are connected to respective terminals in the fuse block F for connection to either the ground G or the battery E.

It is desirable that three operating conditions of the vehicle be indicated by the visual indicator unit 12. These three operating conditions are:

1. Actuation of the vehicle's braking mechanism;
2. Acceleration of the vehicle; and
3. Deceleration of the vehicle. These three conditions can be readily displayed by respective lights 19, 20 and 21 which comprise electrical lamps and lenses of an appropriate color mounted in a suitable housing 22. These lights 19, 20 and 21, which may be red, green and yellow in accordance with the conventional vehicle signal light customs, are preferably arranged in the order indicated in FIG. 3 with the yellow light disposed between the red and green. It will be understood that the specifically illustrated colors of the lights and the arrangement thereof are not a limitative feature and these colors can be arranged and varied in accordance with applicable regulations or requirements.

Versatility in installation of the visual indicating unit 12 as to any particular vehicle is provided by a flexible mounting mechanism which supports the housing 22 in pre-determined relationship to the rear window ledge L of the vehicle. This flexible mounting as illustrated in FIG. 3 comprises a base plate 23 fastened to the ledge L, and a connector post 24 extending between the housing 22 and the base plate. The base plate 23 may be secured to the ledge L with self-tapping screws 25 which project through apertures formed in the plate 23 and into the window ledge. Connector post 24 is attached to the base plate 23 and housing 22 by joints 26 of the ball and socket type which permit substantial relative movement of the housing with respect to the base plate. There is sufficient frictional contact in the ball and socket joints 26 to maintain the housing in the desired position. This type of attachment permits variation in the elevation of the housing 22 with respect to the rear window as well as angular displacement of the housing with consequent directional control of the lenses of the lights in both vertical and horizontal planes.

Consequently, with this type of mounting the housing 22 may be manipulated into a position for optimal viewing for nearly any model or style of vehicle.

The enhanced and substantially improved operating effectiveness of a signal light system is obtained by this invention through incorporation and utilization of a pressure responsive switch 11 for detecting movement or lack of movement of the accelerator pedal. It is the accelerator pedal which provides the most convenient indication of whether or not a vehicle may be accelerating or decelerating and detection of actuation of the accelerator pedal by means of a pressure responsive switch eliminates errors that would otherwise be induced as a consequence of mechanical displacement and attempting to detect that displacement. Application of pressure by the operator's foot to accelerator pedal A provides an immediate response and indication of acceleration when the accelerator pedal A is depressed and held in a selected position. Removal of the foot pressure is also instantly detected by the system to provide an indication that the vehicle is decelerating. A decelerating condition is also indicated when no compressive force is applied to the accelerator pedal switch 11 such as where the vehicle is merely standing and the vehicle brake mechanism is not actuated, but this is not considered to be an improper signal apt to mislead a motorist.

The pressure responsive switch 11 incorporated in the apparatus embodying this invention is of a type which comprises a sheet of material that is formed of a resilient material and includes electrical contacts 27 and 28. These electrical contacts 27 and 28 are indicated in FIG. 3 as the connecting terminals associated with the switch 11 and are connected to respective ones of the two conductors forming the cable 14 interconnecting with the control unit 10. Various construction are employed in pressure responsive switches of this type and such switches are readily available commercially. These switches function in the same manner and require application of the pre-determined minimum compressive force to effect closing of the contacts and form a closed electrical circuit. This predetermined contact closing pressure is conventionally designed to be of the order of four ounces which pressure is ideally for this application where it is very desirable to detect a substantially small decrease in pressure such as that accompanying a deceleration that does not require complete discontinuance of the application of pressure to the accelerator pedal A. A further advantage of these switches is that they may be of a flat and relatively thin configuration as illustrated in FIGS. 2 and 3. These constructions may be easily mounted on the operating surface of the accelerator pedal A by suitable adhesive bonding agents. Not only is installation of this type of pressure switch simple, but a relatively large planar surface is provided to readily accommodate various positions of the operator's foot. These switches are also advantageously constructed so as to require only minimal contact between the operator's foot and the surface of the pedal-mounted switch.

Figure 4:
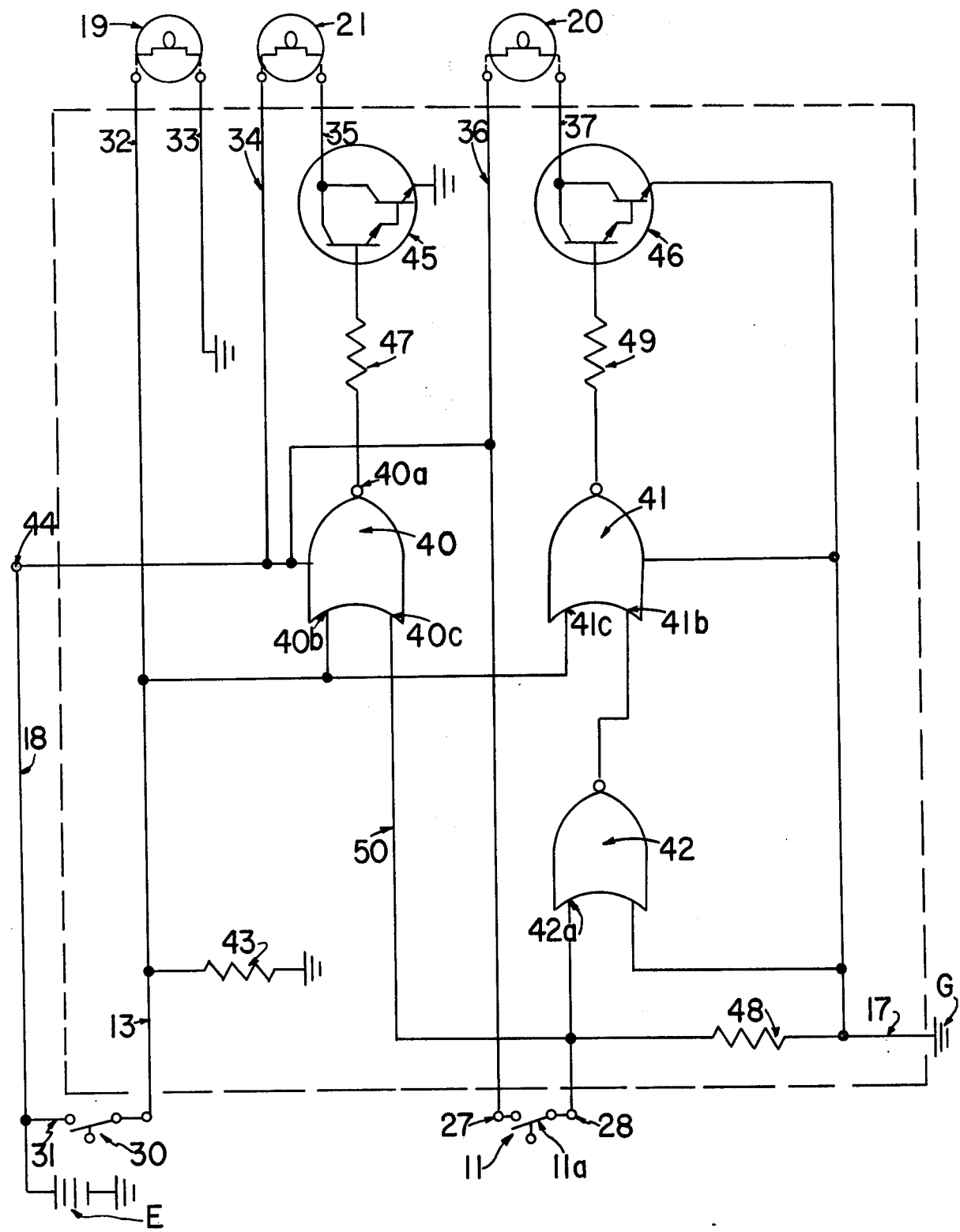
FIG. 4 is a schematic diagram of an electronic control circuit.

The contacts 27 and 28 of switch 11 are incorporated with the switch structure and are represented in FIG. 4 by a movable contact element 11a. The cable 14 is preferably sealed with the pressure responsive switch 11 extending from the upper end of the switch and along the actuating rod R in an upward direction to the control unit 10. This permits the cable 14 to be readily secured by a mounting clip 29 to the actuating rod R to prevent mechanical damage to the cable itself in the installation.

Electrical power for primary control of the system is obtained from the vehicle's brake system. This controlling signal is applied to the control unit 10 through the electrical conductor 13 which is tapped into one of the conductors leading from the brake pressure switch 30 incorporated in the master brake cylinder and which is responsive to the build up in fluid pressure in the hydraulic system indicating actuation of the brakes. An electrical conductor 31 interconnects the vehicle battery to one terminal of the normally open brake pedal switch 30 in the pre-existing vehicle wiring. Conductor 13 is tapped into the conductor leading from the other terminal of the brake pedal switch 30 and going to the pre-existing vehicle brake light system. Consequently, it will be readily seen that operation of the brake pedal B to apply the brakes results in the increase of the hydraulic fluid pressure in the system and produces a voltage signal appearing on conductor 13 and applied to the control unit 10.

Connecting the control unit 10 with the visual indicator unit 12 is the electrical cable 15. Since the indicator unit 12 is provided with three lights 19, 20 and 21 having their respective electrically energized lamps, this cable comprises six separate conductors for providing the electrical interconnection between the electric lights and the control unit circuits for affecting selective energization of the lamps. These six conductors are numbered 32 through 37, respectively, as shown in FIG. 4.

A reliable and error free system is obtained through utilization of a novel electronic control circuit which is mounted in the control unit 10. This control circuit includes solid state electronic devices for affecting the various control functions and may be fabricated by printed circuit methods utilizing economical fabrication techniques and low cost devices. Mechanical protection can be readily provided through fabrication techniques wherein all of the electronic components of the control unit are embedded in a suitable potting compound which is substantially impervious to moisture and is highly resistant to mechanical forces. The entire unit is also encased within a metal housing 38 for even greater mechanical protection with the housing being provided a suitable mounting bracket 39.

Having reference specifically to FIG. 4 which comprises a schematic diagram of the electrical circuit of the control unit 11, it will be noted that each of the indicator lights 19, 20 and 21 are controlled as to energization and illumination by respective sections of the circuit. The red light 19 which has the primary function of indicating application of the vehicle's brake system and is the primary control of other signal functions within the circuit. Energization of the red light in this circuit is effective to prevent energization and illumination of either the green or yellow lights, 20 and 21. This primary control is affected through solid-state gating circuits 40, 41 and 42 which are interconnected in the energization circuits for the green and yellow lights 20 and 21. These gating circuits also are operative to function, when the vehicle braking system is not actuated, to control and provide an inter-lock as between operation of the green and yellow lights, 20 and 21. Specifically, application of an adequate compressive force to the pressure responsive switch 11 on the accelerator pedal A results in closing of the contacts 27 and 28 with energization and illumination of only the green light 20. The electrical interlock capability prevents energization of the yellow light 21. Opening of the electrical circuit between contacts 27 and 28 of the pressure responsive switch 11 as a consequence of decrease or removal of compressive force on the accelerator pedal A results in an electronic switching which energizes the yellow light 21 and operation of the electronic interlock to prevent energization of the green light 20. This electronic interlock is also operable any time that the vehicle's brake system is actuated to produce an overriding control signal that operates the gating circuits 40, 41 and 42 to permit energization only of the red light 19 to thereby positively indicate the braking operation.

Specifics of the control circuit will be readily understood by reference to FIG. 4. It will be noted that the electrical conductor 13 is interconnected with the conductor 32 leading to the red indicator light 19. The other terminal of light 19 is returned to the ground circuit through conductor 33 with the ground connection being shown as directly connected to that conductor. Circuit protection and voltage stabilization is provided by means of a resistor 43 which is connected between the conductor 13 and the ground system. Actuation of the brake pedal B results in closing of the brake pressure switch 30 and results in application of the battery voltage to the system and illumination of the red light 19. Concurrently with energization of the red light 19, this voltage signal is applied to the first input terminal 40b and 41c of each of the gating circuits 40 and 41.

Each of the lights 20 and 21 indicating the acceleration or deceleration respectively of the vehicle have one terminal of each lamp connected to a voltage source terminal 44 through respective conductors 36 and 34. The other terminals of each light 20 and 21 are connected by their respective conductors 35 and 37 to the ground G through interconnecting conductor 17 and by respective dual transistor switching devices 45 and 46.

A second vehicle operational condition that can be displayed by the indicator unit is deceleration of the vehicle. This condition is indicated by illumination of the yellow light 21 and is displayed whenever the brake system is not actuated and insufficient pressure is applied to the accelerator pedal A to cause closing of the contacts 27 and 28. It will be noted that illumination of the yellow light is not only indicative of the vehicle slowing down, but is indicative of the condition where the vehicle is merely standing at idle. In this situation with both the pressure responsive switch 11 and the brake pressure switch 30 being open, the system voltage at terminal 44 is applied to gate circuit 40 which is then in its normal state and provides a biasing signal at its output terminal 40a. This biasing signal is applied through a biasing resistor 47 to the emitter-base of the dual unit transistor 45 which is a Darlington amplifier in the illustrative embodiment. The transistor unit 45 is connected through conductor 35 to the yellow light 21 and is operative in the absence of an adequate base-emitter bias to be conductive, thereby completing a circuit through the light to ground resulting in the illumination thereof. This biasing signal provided by the gating circuit 40 is less than that required for cutt-off of the transistor unit 45 unless a gating signal is applied at either of the two inputs 40b and 40c. As previously indicated, a gating signal is applied to the one input 40b whenever the brake pressure switch 30 is closed and this results in application of a biasing signal to cut-off the transistor unit 45 which then becomes non-conductive and the yellow light 21 is then prevented from being illuminated.

The third operational condition of the vehicle that can be displayed by this signal system is acceleration of the vehicle or maintenance of the vehicle at a constant speed. This condition is detected by the pressure responsive switch 11 which is mounted on the accelerator pedal A as the contacts 27 and 28 will be maintained in a closed circuit condition as a consequence of the compressive force applied thereto by the vehicle operator's foot. With the contacts thus closed, a voltage signal is transmitted from the voltage source terminal 44 through the interconnected conductors to an input 42a of gating circuit 42 and a circuit protecting resistor 48. Application of that input to gating circuit 42 results in application of a signal to an input 41b of the series connected gating circuit 41 which in turn applies a base-emitter bias to the transistor unit 45 through a biasing resistor 49 that is less than that necessary to bias the transistor unit to a cut-off or non-conducting state. Accordingly, the green light 20 will have its one terminal connected through conductor 37 to the electrical ground by transistor unit 46 which is now conductive and the green light will be illuminated.

Concurrently with application of a signal to input 42a of gating circuit 42, a signal is also applied to another input 40c of gating circuit 40 through a conductor 50 which is also connected to the pressure responsive switch contact 28. This signal causes the gating circuit 40 to operate in applying a cut-off bias voltage to the transistor unit 45. With transistor unit 45 thus being made non-conductive, the yellow light 21 will be prevented from being illuminated.

It will be noted that gating circuit 41 also includes a second input 41c which is connected into the brake circuit along with input 40b of gating circuit 40. As previously noted, actuation of the brake pressure switch to a closed circuit condition results in application of a signal to both gating circuit 40 and 41 to cause each circuit to apply a cut-off bias voltage to the respective transistor unit 45 and 46, thereby preventing illumination of either the yellow light 21 or the green light 20.

Figure 5:
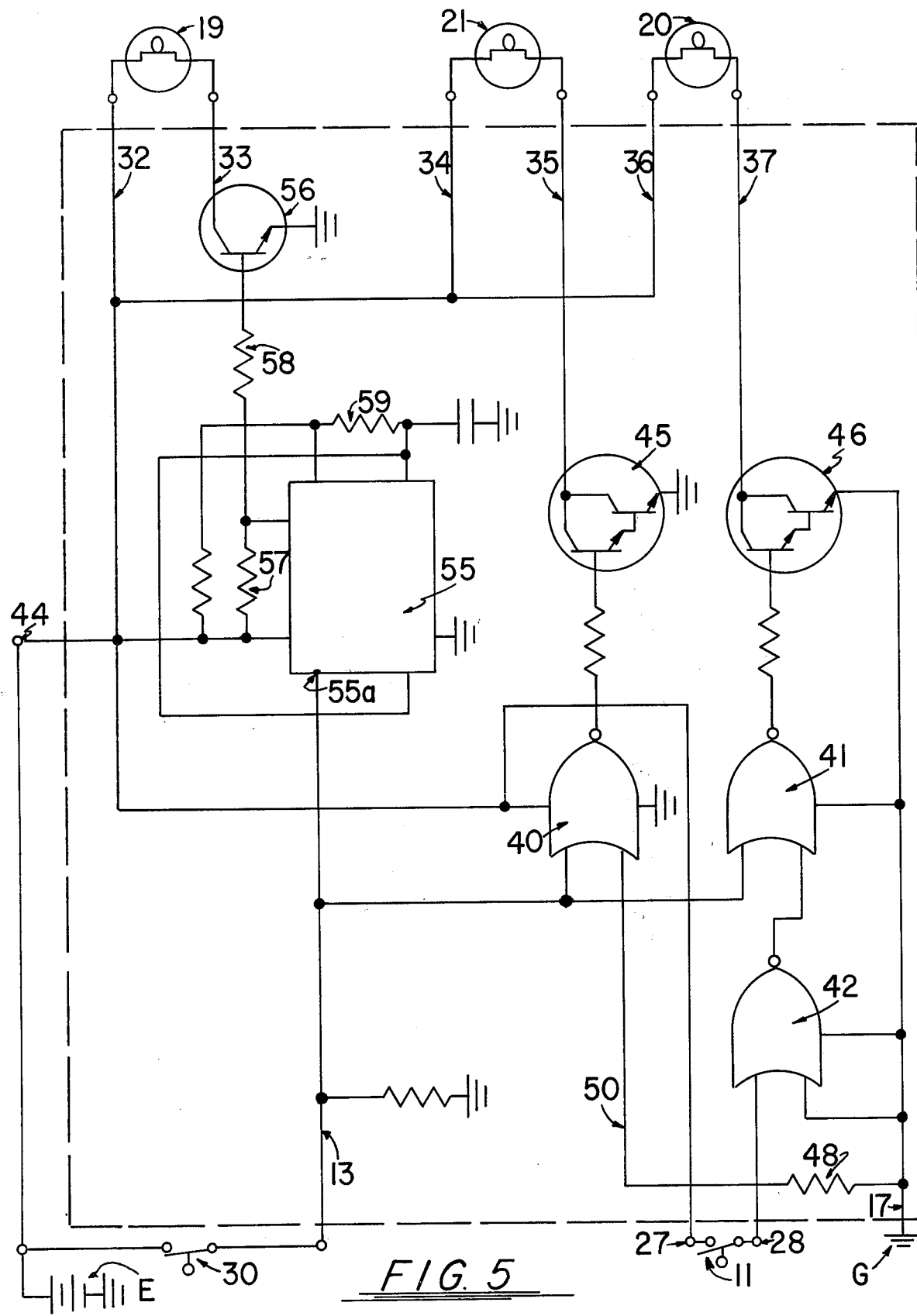
FIG. 5 is a schematic diagram of a modified electronic control circuit.

A modified control circuit is shown in FIG. 5 with the modification comprising incorporation of a timer circuit 55 that causes flashing of each of the lights 19, 20 and 21 as they are selectively connected for energization. The circuit otherwise is the same as that shown in FIG. 4 and the same numerals are applied to the respectively same components. Function and operation of this circuit is the same as that previously described in conjunction with the FIG. 4 circuit with the exception of the timer circuit.

The timer circuit 55 includes an input connected to the brake pressure switch 30 by conductor 13 and it will be noted that conductor 32 leading to the red light 19 is now connected to the voltage source terminal 44. The other conductor 33 leading to the red light 19 is now selectively connectable to the circuit ground through a switching transistor 56. A base-emitter biasing voltage is obtained from the timer output resistor circuit 57 when an input voltage is applied to the base of switching transistor 56 through the biasing resistor 58. This biasing voltage is applied in pre-determined timed relationship to alternatingly switch transistor 56 between conductive and non-conductive states resulting in flashing illumination of red light 19.

The yellow and green lights 21 and 20 may be connected through respective conductors 34 and 36 to a second timer output resistor circuit 59, but are preferably connected directly to the voltage source 44 as shown. Energization and illumination of each of these lamps is thus dependent on operation of the respective dual transistor unit 45 and 46 and not on functioning of the timer 55.

It will be readily apparent from the foregoing detailed description of the embodiments of this invention that a novel vehicular signal light system is provided for indicating the operating conditions of braking, acceleration deceleration. In accordance with this invention, a pressure-responsive, electrical switch mounted on the vehicle's accelerator pedal results in a positive and accurate means of detecting the acceleration and deceleration condition. Positive detection of either condition is assured by a switch of this type which is directly responsive to pedal actuating pressure. The pressure responsive switch comprising a planar sheet of resiliently flexible material is easily mounted on the accelerator pedal and is completely independent of the physical positioning of the pedal or mechanical connection thereof. Selective energization of the signal light for error-free indication of the operating condition is further enhanced by the novel electronic interlock circuit incorporated in the control unit and which is primarily responsive to the brake actuation input.

Having thus described this invention, what is claimed is:

1. An automotive vehicle signal light system comprising:
   A. a plurality of visually distinguishable electric lamps positionable on a vehicle for observation from a position relatively rearward of the vehicle, and
   B. a control circuit having an output connected with said electric lamps and operable for energization of a selected one of said electric lamps in accordance with predetermined vehicle operating conditions, said control circuit including;
      1. a first input connectable with an electrical power source suitable for energization of said lamps,
      2. a second input connectable with the vehicle's brake system and responding to actuation thereof in providing a signal to the control circuit resulting in energization of a first one of said lamps,
      3. a pressure responsive electrical switch connected in the control circuit for effecting energization of a second one of said lamps in response to application of a pre-determined compressive force to said switch and effecting energization of a third one of said lamps when said pre-determined compressive force is not applied to said switch, said switch adapted for mounting on a surface of the vehicle's accelerator pedal in fixed relationship thereto and responding to application of a pre-determined compressive force by the vehicle operator in actuating the accelerator, and
      4. interlock circuit means preventing energization of either said second or third lamps when actuation of the brake system has energized said first lamp and preventing energization of said third lamp when said second lamp is energized.

2. A signal light system according to claim 1 wherein said electrical switch comprises a thin, planar structure mountable on the foot contacting surface of the accelerator pedal.

3. A signal light system according to claim 1 wherein said electrical switch comprises a resilient structure and a normally open set of switch contacts, said switch contacts being closed upon application of a compressive force to said resilient structure.

4. A signal light system according to claim 1 wherein said second input is connectable to the electrical circuit of the vehicle's brake system and receives a voltage signal therefrom upon actuation of the brake system.

5. A signal light system according to claim 1 wherein said control circuit includes time-responsive switch for intermittent energization of said lamps when either the brake system is actuated or said pressure responsive electrical switch is operated.

* * * * *